United States Patent
Mineo et al.

(10) Patent No.: US 12,157,078 B2
(45) Date of Patent: Dec. 3, 2024

(54) DEPTH FILTER

(71) Applicants: JNC CORPORATION, Tokyo (JP); JNC FILTER CO., LTD., Osaka (JP)

(72) Inventors: Ryota Mineo, Shiga (JP); Hisato Nishihara, Shiga (JP); Osamu Yamaguchi, Shiga (JP)

(73) Assignees: JNC CORPORATION, Tokyo (JP); JNC FILTER CO., LTD., Osaka (JP)

( * ) Notice: Subject to any disclaimer, the term of this patent is extended or adjusted under 35 U.S.C. 154(b) by 799 days.

(21) Appl. No.: 17/279,602

(22) PCT Filed: Sep. 18, 2019

(86) PCT No.: PCT/JP2019/036472
§ 371 (c)(1),
(2) Date: May 5, 2021

(87) PCT Pub. No.: WO2020/066767
PCT Pub. Date: Apr. 2, 2020

(65) Prior Publication Data
US 2022/0096976 A1      Mar. 31, 2022

(30) Foreign Application Priority Data
Sep. 26, 2018   (JP) ................... 2018-180090

(51) Int. Cl.
*B01D 39/16*      (2006.01)
*B01D 39/08*      (2006.01)
(Continued)

(52) U.S. Cl.
CPC ......... *B01D 39/163* (2013.01); *B01D 39/083* (2013.01); *B32B 1/00* (2013.01);
(Continued)

(58) Field of Classification Search
CPC ............... B01D 39/163; B01D 39/083; B01D 39/1623; B32B 1/00; B32B 5/022;
(Continued)

(56) References Cited

U.S. PATENT DOCUMENTS

2008/0318024 A1    12/2008   Angadjivand et al.

FOREIGN PATENT DOCUMENTS

| EP | 3296006 | 3/2018 |
|----|---------|--------|
| JP | H1190135 | 4/1999 |

(Continued)

OTHER PUBLICATIONS

"Search Report of Europe Counterpart Application", issued on Oct. 19, 2021, p. 1-p. 8.
(Continued)

*Primary Examiner* — Chester T Barry
(74) *Attorney, Agent, or Firm* — JCIPRNET (57) ABSTRACT

A depth filter with excellent filtration accuracy and pressure resistance performance even for fluids containing high density and high viscosity powder fine particles. A depth filter having a base material layer, a filtration layer, and a skin layer, in that order, wherein: the substrate layer and the skin layer are layers made by a nonwoven fabric being wound and thermally fused; the filtration layer is a laminate in which at least a nonwoven fabric and a net are laminated, being wound twice or more; and the nonwoven fabric contained in the filtration layer contains a mixed-fiber nonwoven fabric containing two or more types of fibers with mutually different average fiber diameters.

10 Claims, 1 Drawing Sheet

(51) Int. Cl.
  *B32B 1/00* (2006.01)
  *B32B 5/02* (2006.01)
  *B32B 5/26* (2006.01)
  *D04H 1/541* (2012.01)
  *D04H 1/544* (2012.01)

(52) U.S. Cl.
  CPC .............. *B32B 5/022* (2013.01); *B32B 5/028* (2013.01); *B32B 5/268* (2021.05); *B32B 5/273* (2021.05); *D04H 1/5412* (2020.05); *D04H 1/5418* (2020.05); *D04H 1/544* (2013.01); *B01D 2239/0208* (2013.01); *B01D 2239/0216* (2013.01); *B01D 2239/0618* (2013.01); *B01D 2239/0622* (2013.01); *B01D 2239/0636* (2013.01); *B01D 2239/064* (2013.01); *B01D 2239/0654* (2013.01); *B01D 2239/0668* (2013.01); *B01D 2239/069* (2013.01); *B01D 2239/1233* (2013.01); *B32B 2250/04* (2013.01); *B32B 2250/20* (2013.01); *B32B 2250/242* (2013.01); *B32B 2262/0253* (2013.01); *B32B 2262/124* (2021.05); *B32B 2262/144* (2021.05); *B32B 2307/726* (2013.01); *D04H 1/5414* (2020.05); *D04H 1/5416* (2020.05); *D10B 2505/04* (2013.01)

(58) Field of Classification Search
  CPC ......... B32B 5/028; B32B 5/268; B32B 5/273; B32B 5/08; B32B 5/26; B32B 7/02; D04H 1/5412; D04H 1/5418; D04H 1/544; D04H 1/5414; D04H 1/5416; D04H 1/559
  See application file for complete search history.

(56) References Cited

FOREIGN PATENT DOCUMENTS

| | | |
|---|---|---|
| JP | 2000218113 | 8/2000 |
| JP | 2010137121 | 6/2010 |
| JP | 2015097979 | 5/2015 |
| JP | 2018126721 | 8/2018 |
| JP | 2019077962 | 5/2019 |
| WO | 2015046564 | 4/2015 |

OTHER PUBLICATIONS

"Office Action of Europe Counterpart Application", issued on Aug. 16, 2024, p. 1-p. 4.

"Office Action of Korea Counterpart Application", issued on Aug. 24, 2024, with English translation thereof, p. 1-p. 13.

"International Search Report (Form PCT/ISA/210) of PCT/JP2019/036472", mailed on Dec. 10, 2019, with English translation thereof, pp. 1-4.

DEPTH FILTER

CROSS-REFERENCE TO RELATED APPLICATION

This application is a 371 application of the international PCT application serial no. PCT/JP2019/036472, filed on Sep. 18, 2019, which claims the priority benefit of Japan application no. 2018-180090, filed on Sep. 26, 2018. The entirety of each of the above-mentioned patent applications is hereby incorporated by reference herein and made a part of this specification.

TECHNICAL FIELD

The present invention relates to a depth filter for filtering a fluid containing fine particles.

BACKGROUND ART

As a fluid containing fine particles, there is a gel-like fluid containing slurries or powders. Filters are used to purify and filter solid contents from such a fluid.

On the other hand, in a slurry of a lithium secondary battery material or the like, a concentration of solid contents has been increased for the purpose of reducing a drying time after filtration, reducing a condensed amount of a volatilized liquid, or the like. However, as the concentration increases, a viscosity of the fluid increases and an interaction between powders is strengthened, and thus filtration with a filter becomes difficult. For example, it is known that, when a cartridge filter for water is used for filtering a slurry, even if powders in the slurry are each smaller than an average pore size of the filter, clumping (bridging) of powder particles occurs and an apparent particle size increases when the powders pass through the filter, causing clogging. This is called a rush phenomenon.

Patent Literature 1 proposes a filter solving problems such as a change in filtration accuracy due to differential pressure and reduction in filter life when a viscous fluid is filtered, and capable of capturing soft gel-like solid contents even when a pulse pressure or a high differential pressure is generated. In the invention of Patent Literature 1, a main filtration layer of the filter includes a first main filtration layer which has been thermally fused and has a porosity of 50 to 80%, and a second main filtration layer which has not been thermally fused and has a porosity of 80% or more, in which a second main filtration nonwoven fabric is configured to have a porosity of 1.2 times or more that of a first main filtration nonwoven fabric.

Also, in order to obtain a high-accuracy filter having satisfactory shape retention and an excellent balance between filtration accuracy and filtration life, a nonwoven fabric for a filter in which at least two layers of nonwoven fabric are laminated, a filling factor of a nonwoven fabric on an upper layer side is 0.3 to 0.8, and a filling factor of the nonwoven fabric on a lower layer side is 0.01 to 0.25 has been proposed (Patent Literature 2). An objective of this invention is to filter fine particles such as submicron particles with high accuracy and it is intended to improve utilization efficiency and shape retention of the filter by disposing a nonwoven fabric layer having a low filling factor on a lower layer side of the filter to maintain a minute space on a contact surface between the nonwoven fabric layer and a support material and cause it also to act as a cushioning material.

Further, as an objective of providing a filter in which agglomerates (bridges) of powder particles are not easily generated and a time until a differential pressure of filtration is generated is long, that is, a filter with a long filtration life, a filter including a base material layer, a filtration layer, and a skin layer in which the filtration layer is formed as a layer in which a laminate in which at least a through-air nonwoven fabric and a net are laminated is wound multiple times and is not pressed, and an average pore diameter of a nonwoven fabric constituting the base material layer and the skin layer is made larger than an average pore diameter of the through-air nonwoven fabric constituting the filtration layer has been proposed (Patent Literature 3).

CITATION LIST

Patent Literature

Patent Literature 1

Japanese Patent Laid-Open No. 2010-137121

Patent Literature 2

Japanese Patent Laid-Open No. 2000-218113

Patent Literature 3

Japanese Patent Laid-Open No. 2015-97979

SUMMARY OF INVENTION

Technical Problem

As described above, various improvements have been made to filters, but a filter having sufficient filtration accuracy for a slurry that has increased in concentration and viscosity and capable of filtration for a long period of time has not yet been obtained. Particularly, in a slurry for a lithium secondary battery, a viscosity of the slurry has continued to increase as a concentration of solid contents has increased, and in the current situation, such a slurry contains coarse particles. Therefore, there is a demand for a filter that allows fine particles to pass while removing coarse particles in a high-viscosity slurry. Particle sizes of useful fine particles depend on specifications of battery devices but are often about several micrometers to 50 μm.

In view of this situation, the present invention provides a filter having excellent filtration accuracy and pressure resistance for enabling filtration for a long period of time even for a fluid containing high-concentration and high-viscosity powder fine particles.

Solution to Problem

While addressing the above-described problems, the inventors found that since a large load is applied to a filter when a high-viscosity slurry passes through the filter, the filter needs to have pressure resistance that can withstand the load, and further found that a rush phenomenon frequently occurs and clogging occurs easily in filtering a high-concentration slurry, and worked on improving a filter with these as main points of focus. Then, they found that a filtration accuracy significantly improves, pressure resistance improves, and clogging does not easily occur when a configuration in which a nonwoven fabric and a net are wound twice or more is employed as a filtration layer, and further, a mixed-fiber nonwoven fabric that is formed to contain a plurality of types of fibers having different deniers (fiber diameters) is included as at least a part of the nonwoven fiber used for the filtration layer, and thereby a filter having excellent filtration accuracy and pressure resistance can be obtained, and thus completed the present invention.

That is, the present invention includes the following configurations.

[1] A depth filter comprising a base material layer, a filtration layer, and a skin layer in that order, in which
the base material layer and the skin layer are layers in which a nonwoven fabric is wound and thermally fused, and
the filtration layer is formed by winding a laminate in which at least a nonwoven fabric and a net are laminated twice or more and the nonwoven fabric included in the filtration layer is a mixed-fiber nonwoven fabric formed to contain two or more types of fibers having different average fiber diameters from each other.

[2] The depth filter according to [1], in which
the nonwoven fabric constituting the base material layer or the skin layer and the nonwoven fabric constituting the filtration layer are different nonwoven fabrics from each other, and
an average fiber diameter of the nonwoven fabric constituting the base material layer or the skin layer is larger than an average fiber diameter of the nonwoven fabric constituting the filtration layer.

[3] The depth filter according to [1] or [2], in which the mixed-fiber nonwoven fabric included in the filtration layer and formed to contain two or more types of fibers having different average fiber diameters from each other is a nonwoven fabric in which a first fiber having an average fiber diameter of 0.5 μm or more and a second fiber having an average fiber diameter of 1 μm or more and thicker than the first fiber are mixed at a ratio of 1:99 to 90:10.

[4] The depth filter according to any one of [1] to [3], in which the mixed-fiber nonwoven fabric included in the filtration layer and formed to contain two or more types of fibers having different average fiber diameters from each other contains a polyolefin-based sheath-core type composite fiber as the two or more types of fibers.

[5] The depth filter according to any one of [1] to [4], in which the filtration layer includes
the mixed-fiber nonwoven fabric formed to contain two or more types of fibers having different average fiber diameters from each other, and
a nonwoven fabric formed by one type of fiber having an average fiber diameter of 0.5 to 200 μm.

[6] The depth filter according to any one of [1] to [5], in which
the filtration layer includes two or more mixed-fiber nonwoven fabrics which are formed to contain two or more types of fibers having different average fiber diameters from each other.

[7] The depth filter according to any one of [1] to [6], in which the nonwoven fabric included in the filtration layer is a melt-blown nonwoven fabric and/or a through-air nonwoven fabric.

[8] The depth filter according to any one of [1] to [7], in which the net has a mesh size in a range of 1 to 5 mm and has an average fiber diameter in a range of 50 to 300 μm.

[9] The depth filter according to any one of [1] to [8], in which the nonwoven fabric constituting the base material layer is a melt-blown nonwoven fabric or a through-air nonwoven fabric of a polyolefin-based fiber.

[10] The depth filter according to any one of [1] to [9], in which the nonwoven fabric constituting the base material layer and the nonwoven fabric constituting the skin layer are the same nonwoven fabric.

Advantageous Effects of Invention

According to the present invention, it is possible to provide a filter having excellent filtration accuracy and pressure resistance, having excellent classification performance in removing coarse particles and allowing fine particles to pass, and in which clogging is not easily caused even for a high-concentration and high-viscosity slurry.

DESCRIPTION OF EMBODIMENTS

A depth filter of the present invention is a depth filter including a base material layer, a filtration layer, and a skin layer in that order, the base material layer and the skin layer are layers in which a nonwoven fabric is wound and thermally fused, and the filtration layer is formed by winding a laminate in which at least a nonwoven fabric and a net are laminated twice or more and the nonwoven fabric included in the filtration layer is a mixed-fiber nonwoven fabric formed to contain two or more types of fibers having different average fiber diameters from each other.

As described above, the filtration layer of the depth filter of the present invention has a feature in which a laminate in which at least a nonwoven fabric and a net are laminated is wound, and the nonwoven fabric constituting the filtration layer is a mixed-fiber nonwoven fabric formed to contain two or more types of fibers having different average fiber diameters from each other. Although not bound by a particular theory, the depth filter of the present invention has gaps appropriately formed between a lamination of the nonwoven fabrics which are substantially responsible for a filtration function in the filtration layer by laminating the nonwoven fabric and the net. Therefore, it is thought that fluidity of a fluid or powders in the fluid is improved in the filtration layer, and formation of bridges is suppressed. Also, by positioning the net between the lamination of the nonwoven fabrics, pores are prevented from being reduced in diameter or clogged by overlapping layers of the nonwoven fabric. Further, it is thought that, since bonding of the laminate between the nonwoven fabric and the net is weak or at least a part thereof is not thermally fused, the nonwoven fabric can move slightly in the filtration layer, fluidity of a fluid or powders in the fluid is further improved, and a shape of the filtration layer is retained by the net so that filtration performance is stably exhibited. Furthermore, it is thought that, since the mixed-fiber nonwoven fabric formed to contain two or more types of fibers having different average fiber diameters from each other is employed as at least a part of the nonwoven fabrics included in the filtration layer, a depth filter having excellent classification performance (capturing coarse particles and allowing particles having a particle size of a certain level or less to pass) and high pressure resistance can be obtained.

<Filtration Layer Nonwoven Fabric>

As described above, the filtration layer is configured using a laminate in which at least a nonwoven fabric and a net are laminated. The nonwoven fabric used for the filtration layer is not particularly limited as long as desired performance can be obtained, and for example, a through-air nonwoven fabric, a melt-blown nonwoven fabric, a spunbonded nonwoven fabric, a spunlaced nonwoven fabric, or the like can be used, and among them, the through-air nonwoven fabric is preferably used because it is bulky and a fiber orientation is distributed also in a thickness direction (a direction in which a fluid to be filtered flows) of the nonwoven fabric. "Through-air nonwoven fabric" refers to a nonwoven fabric obtained by a hot air bonding process. "Hot air bonding process" is a method for enhancing a bonding effect and obtaining a nonwoven fabric that is uniform in a thickness direction by installing a conveyor belt or a rotary drum in an oven, passing a web therethrough, and then suctioning it to one side, and is also referred to as an air-through method. The through-air nonwoven fabric is also referred to as an air-through nonwoven fabric.

The through-air nonwoven fabric is generally obtained by passing short fibers having crimps through a carding machine to form a web, treating the obtained web with hot air, and thermally fusing entangled points between the short fibers. The short fibers constituting the through-air nonwoven fabric are preferably fused and/or bonded to each other at intersections of the short fibers to maintain stable performance. Due to this, a thermally fusible composite fiber can be preferably utilized as the short fibers. Types of the thermally fusible composite fiber are not particularly limited and known composite fibers can be used. As the thermally fusible composite fiber, a composite fiber formed of two or more types of components having a melting point difference therebetween can be used, and specifically, a composite fiber formed of a high melting point component and a low melting point component can be exemplified. As the high melting point component of the composite fiber, thermoplastic resins such as polypropylene (PP), polyethylene terephthalate (PET), polybutylene terephthalate, polytrimethylene terephthalate, nylon 6, nylon 6,6, and poly-L-lactic acid can be exemplified, and as the low melting point component of the composite fiber, thermoplastic resins such as polyethylene (PE) including low density polyethylene, linear low-density polyethylene, high density polyethylene, ultra-high molecular weight polyethylene, and the like, a polyethylene terephthalate copolymer, poly-DL-lactic acid, a propylene copolymer, and polypropylene can be exemplified. Although a melting point difference between the high melting point component and the low melting point component of the thermally fusible composite fiber is not particularly limited, in order to extend a processing temperature range of thermal fusion, the melting point difference is preferably 15° C. or higher and more preferably 30° C. or higher. Also, a form of the composite is not particularly limited, but a composite form such as a concentric sheath-core type, an eccentric sheath-core type, a parallel type, a sea-island type, or a radial type can be employed. Particularly, an eccentric sheath-core type composite fiber is suitable for imparting bulkiness.

In the present invention, the nonwoven fabric in the filtration layer includes a mixed-fiber nonwoven fabric formed to contain two or more types of fibers having different average fiber diameters from each other. Types of fibers contained in the mixed-fiber nonwoven fabric may be two or more types or may be three, four, or more types as long as the effect of the invention can be obtained but are preferably two types.

As the fiber constituting the filtration layer nonwoven fabric, a fiber having an average fiber diameter in a range of 0.1 to 200 µm can be used, and it can be appropriately selected according to properties of a filtrate and a purpose of filtration. In the present invention, as the two types of fibers, it is preferable to mix for example, a first fiber having an average fiber diameter of 0.5 µm or more and a second fiber having an average fiber diameter of 1 µm or more and thicker than the first fiber, and it is more preferable to mix a fiber having an average fiber diameter of 5 to 50 µm as a fine fiber (first fiber) and a fiber having an average fiber diameter of 20 to 200 µm as a thick fiber (second fiber). The average fiber diameter of the second fiber is preferably 1.5 times or more and more preferably 1.7 times or more the average fiber diameter of the first fiber. As the fibers to be mixed, those having the same composition as each other but differing only in fiber diameter may be used, or two or more types of fibers having different compositions and fiber diameters can be mixed and used. Also, in the filtration layer, a mixed-fiber nonwoven fabric of one type may be used, and it is also preferable to use mixed-fiber nonwoven fabrics of two or more types. Further, when an average fiber diameter of the mixed-fiber nonwoven fabric is referred to, it refers to an average fiber diameter of the entire mixed-fiber nonwoven fabrics calculated from average fiber diameters of a plurality of types of contained fibers and content ratios of them.

A ratio by weight of mixed fibers in the mixed-fiber nonwoven fabric is not particularly limited as long as desired filtration performance can be exhibited, and for example, a ratio by weight of the fine fiber (the first fiber) to the thick fiber (the second fiber) can be a ratio of 1:99 to 90:10, and preferably a ratio of 10:90 to 80:20. More specifically, for example, it is more preferable that the first fiber having an average fiber diameter of 5 to 50 µm and the second fiber having an average fiber diameter of 20 to 200 µm and thicker than the first fiber be mixed at a ratio of 10:90 to 90:10, and it is still more preferable that the first fiber having an average fiber diameter of 10 to 50 µm and the second fiber having an average fiber diameter of 30 to 100 µm and thicker than the first fiber be mixed at a ratio of 10:90 to 80:20.

In the mixed fiber of the first fiber and the second fiber, by making the ratio of the average fiber diameter and the ratio by weight of the mixed fiber to be in the above-described ranges, a depth filter having excellent pressure resistance can be obtained. Although not bound by a particular theory, since the thick fibers are thought to serve the role of removing coarse particles and maintaining pressure resistance, and the fine fibers are thought to serve the role of classifying fine particles in the mixed-fiber nonwoven fabrics, by mixing the thick fibers in a part of the filtration layer nonwoven fabric having desired filtration accuracy, an effect of improving pressure resistance can be obtained. Further, since the thick fibers are firmly coupled, deformation or expansion of openings formed between the fibers is prevented, and as a result, it is thought that coarse particles can be steadily captured on an outer side of a filter medium, and thereby efficient depth filtration can be achieved.

Also, as the filtration layer nonwoven fabric, in addition to the above-described mixed-fiber nonwoven fabric, it is also preferable to use a nonwoven fabric formed of one type of fiber (referred to as a single-fiber nonwoven fabric) having an average fiber diameter of 0.5 to 200 µm. The average fiber diameter of the single-fiber nonwoven fabric is more preferably 10 to 200 µm. As the single-fiber nonwoven fabric to be used together with the mixed-fiber nonwoven fabric, a through-air nonwoven fabric, a melt-blown nonwoven fabric, a spunbonded nonwoven fabric, a spunlaced nonwoven fabric, and the like can be used, but it is preferable to use a through-air nonwoven fabric similarly to the mixed-fiber nonwoven fabric. Also, a material of the nonwoven fabric can also be exemplified by the same material as that of the mixed-fiber nonwoven fabric, and specifically, a through-air nonwoven fabric made of an eccentric sheath-core type composite fiber containing, for example, polypropylene serving as a high melting point component as a core component and polyethylene serving as a low melting point component as a sheath component can be used.

When the mixed-fiber nonwoven fabric and the single-fiber nonwoven fabric are used together in the filtration layer, a portion made of the single-fiber nonwoven fabric may be positioned on an upstream side of the filtration layer, or the portion made of the single-fiber nonwoven fabric may be positioned on a downstream side of the filtration layer. Also, an average fiber diameter of the single-fiber nonwoven fabric may be larger or smaller than an average fiber diameter of the mixed-fiber nonwoven fabric. When the average fiber diameter of the single-fiber nonwoven fabric is larger than the average fiber diameter of the mixed-fiber nonwoven fabric, filtration accuracy can be made coarser by disposing the single-fiber nonwoven fabric on an outer side of the filtration layer (upstream side of a filtrate). Conversely, when the average fiber diameter of the single-fiber nonwoven fabric is smaller than the average fiber diameter of the mixed-fiber nonwoven fabric, the filtration accuracy can be made finer by disposing the single-fiber nonwoven fabric on an inner side of the filtration layer (downstream side of the filtrate).

When the mixed-fiber nonwoven fabric and the single-fiber nonwoven fabric are used together, a ratio of the mixed-fiber nonwoven fabric to the single-fiber nonwoven fabric can be 90:10 to 10:90. As the ratio of the mixed-fiber nonwoven fabric becomes larger, the classification performance is improved. When a single-fiber nonwoven fabric made of a large denier fiber is inserted on an outer side of the mixed-fiber nonwoven fabric, coarse particles can be removed, and thereby a filtration life is prolonged. On the other hand, when a single-fiber nonwoven fabric made of a small denier fiber is inserted on an inner side of the mixed-fiber nonwoven fabric, a particle capture rate of fine particles is improved. That is, insertion positions of the mixed-fiber nonwoven fabric and the single-fiber nonwoven fabric in the filter medium of the filter may be determined according to a slurry. When a ratio of the mixed-fiber nonwoven fabric to the single-fiber nonwoven fabric is 15:85 to 85:15, a balance between classification performance and pressure resistance is excellent, and this is preferable. In order to obtain an effect of the present invention using the mixed-fiber nonwoven fabric, it is preferable to use 15% or more of the mixed-fiber nonwoven fabric in the filtration layer nonwoven fabric.

A basis weight of the filtration layer nonwoven fabric is defined to some extent in relation to a fiber material and a fiber diameter, but for example, 5 to 100 g/m² can be used, and it may preferably be 20 to 60 g/m² and more preferably 25 to 55 g/m². When the basis weight is 25 to 55 g/m², a selection range for adjusting a thickness of the filtration layer and filtration performance is extended, and this is preferable.

The thermally fusible composite fiber used for the filtration layer nonwoven fabric may contain a functional agent within a scope not hindering the effect of the present invention, and examples of the functional agent include an antibacterial agent, a deodorant, an antistatic agent, a smoothing agent, a hydrophilic agent, a water repellent agent, an antioxidant, a weather-resistant agent, and the like. Also, a surface of the thermally fusible composite fiber may be treated with a fiber finishing agent, and thereby functions such as hydrophilicity or water repellency, antistatic control property, surface smoothness, and wear resistance can be imparted.

<Net>

A net inserted into the filtration layer does not affect collection efficiency of the depth filter, but it is used to create gaps between nonwoven fabrics, retain a shape of the filtration layer, and maintain/improve pressure resistance. Therefore, preferably a monofilament having a fiber diameter in a range of 50 to 300 μm and more preferably a monofilament having a fiber diameter in a range of 60 to 280 μm is used as the net. Further, a mesh size of the net is preferably in a range of 1 to 5 mm and more preferably in a range of 1 to 4 mm. By using the net in this range, a strength of the filter is secured without affecting collection efficiency, and thereby a filter with a longer filtration life can be obtained.

The monofilament is not particularly limited, but is preferably formed of a thermoplastic resin, and for example, a single constituent fiber, a composite fiber, and a mixed fiber can be utilized. A thermoplastic resin that can be used for the monofilament is not particularly limited as long as it is a thermoplastic resin that can be melt-spun, but for example, the thermoplastic resins exemplified for the thermally fusible composite fiber can be used. For example, polyethylene, polypropylene, polyester, nylon 6, nylon 6,6, nylon 6,12, and the like can be exemplified, and among them, polypropylene, and nylon 6 or nylon 6,6 are particularly preferable. As the monofilament, one type of these thermoplastic resins may be used, or a mixture of two or more types of the thermoplastic resins may be used. Also, in a case in which the monofilament is a composite fiber, by using a combination of the thermoplastic resins exemplified for the thermally fusible composite fiber, intersections of the monofilaments can be thermally fused by heat treatment, and this is preferable because it does not cause misalignment.

<Configuration of Filtration Layer>

The filtration layer of the depth filter of the present invention is formed by winding the laminate in which at least the above-described nonwoven fabric and net are laminated twice or more. A lamination order of the nonwoven fabric and the net is not particularly limited, but the nonwoven fabric and the net are preferably wound one sheet by one sheet, that is, the nonwoven fabric and the net are preferably wound to be alternate one layer by one layer. The filtration layer formed in this way has a structure in which a coarse net is sandwiched between the nonwoven fabrics, and the nonwoven fabrics are laminated without being in close contact with each other. When the mixed-fiber nonwoven fabric and the single-fiber nonwoven fabric are used together as the nonwoven fabric, the mixed-fiber nonwoven fabric (or the single-fiber nonwoven fabric) and the net can be first laminated and wound to a predetermined length, and then the single-fiber nonwoven fabric (or the mixed-fiber nonwoven fabric) and the net can be laminated and wound to a predetermined length.

The laminate used for the filtration layer may be all thermally fused but may have a portion that is not thermally fused. When a portion that is not thermally fused is included, bulkiness of the nonwoven fabric is maintained. Further, "not thermally fused" means that at least a part of the filtration layer is not in a form of being integrally cured by thermal fusion, and a part of the filtration layer may be thermally fused for the purpose of improving shape retention of the filter. Also, thermo-compression bonding, thermal fusion, or bonding may be performed between the filtration layer and the base material layer, or between the filtration layer and the skin layer.

Also, if necessary, an additional nonwoven fabric, net, or the like may be laminated in addition to the above-described nonwoven fabric and net. For example, a laminate having a three-layer structure can be wound by inserting a coarse melt-blown nonwoven fabric in addition to the mixed-fiber nonwoven fabric, the single-fiber nonwoven fabric, and the net to improve shape retention and collection efficiency of the filtration layer. When the melt-blown nonwoven fabric is laminated in the filtration layer, it is preferable to use the same melt-blown nonwoven fabric as that used in the base material layer or the skin layer.

It is known from the log-penetrating expression that collection efficiency is controlled by a thickness of a filtration layer through which a fluid passes, and the thickness of the filtration layer (the number of turns of the laminate) can be appropriately selected according to collection efficiency to be obtained. As the thickness of the filtration layer (the number of turns of the laminate) increases, the collection efficiency improves and powders having a smaller particle size can be collected.

<Base Material Layer Nonwoven Fabric>

The base material layer nonwoven fabric used in the present invention is not particularly limited as long as it can be thermally fused and shape retention required as the base material layer of the depth filter can be secured after thermal fusion, and a melt-blown nonwoven fabric, a through-air nonwoven fabric, a spunbonded nonwoven fabric, a spunlaced nonwoven fabric, and the like can be used.

When a melt-blown nonwoven fabric is used as the base material layer nonwoven fabric, types of fibers constituting the melt-blown nonwoven fabric and a method of manufacturing the same are not particularly limited and known fibers and manufacturing methods can be used. For example, the melt-blown nonwoven fabric can be manufactured by melt-extruding a thermoplastic resin, spinning it from a melt-blown spinneret, further blow-spinning it as a flow of ultrafine fibers with a high-temperature and high-speed gas, collecting the ultrafine fibers as webs with a collecting device, heat-treating the obtained webs, and thermal fusing the ultrafine fibers to each other. As the high-temperature and high-speed gas used in melt-blown spinning, an inert gas such as air or nitrogen gas is normally used. A temperature of the gas in a range of 200 to 500° C. and a pressure range of 0.1 to 6.5 kgf/cm$^2$ are generally used.

When the melt-blown nonwoven fabric is used as the base material layer nonwoven fabric, a fiber diameter thereof can be appropriately selected according to properties of a filtrate and the purpose of filtration but is preferably larger than an average fiber diameter of the nonwoven fabrics constituting the filtration layer. Specifically, for example, an average fiber diameter thereof is preferably 1 to 149 μm, more preferably 6 to 149 μm, and most preferably 8 to 149 μm. When the average fiber diameter of the fibers constituting the melt-blown nonwoven fabric is 1 μm or more, productivity is satisfactory, a mechanical strength of ultrafine fibers constituting the melt-blown nonwoven fabric is high, and single yarn breakage of the ultrafine fibers and tearing of an ultrafine fiber layer do not easily occur. Also, when an average fiber diameter of the fibers constituting the melt-blown nonwoven fabric is 149 μm or less, original characteristics of the ultrafine fibers derived from smallness (fineness) of the fiber diameter are fully exhibited.

Also, a basis weight of the base material layer nonwoven fabric is defined to some extent in relation to a fiber material and a fiber diameter, but for example, a basis weight of 5 to 100 g/m$^2$ can be used, and a basis weight of 30 to 60 g/m$^2$ may be more preferably used. When the basis weight is within this range, it is suitable from the perspective of adjusting an outer diameter of the filter and adjusting a strength design of the base material layer.

As the melt-blown nonwoven fabric for the base material layer, a melt-blown nonwoven fabric made of single constituent fibers, a melt-blown nonwoven fabric made of composite fibers, a melt-blown nonwoven fabric made of mixed fibers, or the like can be utilized. Also, a resin that can be used for the above-described melt-blown nonwoven fabric is not particularly limited as long as it is a thermoplastic resin that can be melt-spun, but for example, the thermoplastic resins exemplified for the thermally fusible composite fiber can be used, and a single thermoplastic resin may be used, or a mixture of two or more types of the thermoplastic resins may be used. Further, the thermoplastic resin may contain functional agents of various types within a scope not hindering the effect of the present invention, and specifically, an antibacterial agent, a deodorant, a hydrophilic agent, a water repellent agent, a surfactant, and the like can be exemplified. Also, the melt-blown nonwoven fabric may be subjected to secondary processing to be imparted with a function within a scope not hindering an effect thereof, and a hydrophilic or hydrophobic coating treatment, a chemical treatment for introducing a specific functional group on a surface of the ultrafine fiber that constitutes the melt-blown nonwoven fabric, a sterilization treatment, and the like can be exemplified.

As the resin used for the base material layer nonwoven fabric, polyolefin-based resins such as polyethylene (low density polyethylene, linear low-density polyethylene, high-density polyethylene, and ultra-high molecular weight polyethylene), and polypropylene (a propylene copolymer containing propylene as a main component, and crystalline polypropylene), polyester-based resins such as polyethylene terephthalate and polybutylene terephthalate, and polyamide-based resins such as nylon 6, nylon 6,6, and nylon 6,12 can be exemplified. When a through-air nonwoven fabric is used as the base material layer nonwoven fabric, general through-air nonwoven fabrics exemplified in the filtration layer nonwoven fabric can be utilized.

The base material layer is a layer mainly for securing a strength of the filter and is preferably a layer on which a melt-blown nonwoven fabric is laminated and integrated by thermal fusion. A thickness and the number of turns of the base material layer are appropriately set according to a melt-blown nonwoven fabric to be used but are not particularly limited as long as a strength of the filter can be secured and a certain level of filtration performance can be obtained.

<Skin Layer>

The skin layer is a layer positioned on an outermost side of the filter (upstream side of a filtrate) and is a layer whose main purpose is to protect the filtration layer and retain a shape of the filter in addition to blocking agglomerates or impurities particularly having a large particle size from entering the filtration layer.

The skin layer is a layer including a nonwoven fabric and is preferably a layer made of a nonwoven fabric. The nonwoven fabric used for the skin layer is not particularly limited, but an average fiber diameter thereof is preferably larger than the average fiber diameter of the filtration layer nonwoven fabric. A material of the nonwoven fabric also is not particularly limited, and the same average fiber diameter and material as those exemplified in the base material layer nonwoven fabric can be used. As the skin layer nonwoven fabric, the same nonwoven fabric as the base material layer nonwoven fabric can be used. Specifically, for example, a melt-blown nonwoven fabric of a polyolefin-based fiber can be used as the skin layer nonwoven fabric and the base material layer nonwoven fabric.

The number of turns and a thickness of the skin layer are not particularly limited, but when the number of turns and the thickness increase, a problem in which bridges are formed in the skin layer before a filtrate reaches the filtration layer may occur, and therefore it is preferable to make the skin layer as thin as possible. For example, it is preferable that the melt-blown nonwoven fabric be wound 1 to 5 times and preferably once or twice and then thermally fused to form the skin layer from the perspective of reducing formation of the bridges.

<Method of Manufacturing Depth Filter>

The depth filter of the present invention can be manufactured by winding the base material layer nonwoven fabric, the filtration layer nonwoven fabric and the net, and the skin layer nonwoven fabric in that order while laminating them. Specifically, for example, a melt-blown nonwoven fabric, which is the base material layer nonwoven fabric, may be first wound around a columnar iron rod while being thermally fused to form the base material layer as a core. Next, a through-air nonwoven fabric and a net, which are the filtration layer nonwoven fabric, are sequentially inserted and wound without heating to form the filtration layer. Finally, a melt-blown nonwoven fabric, which is the skin layer nonwoven fabric, is wound once or twice and thermally fused to form the depth filter.

A temperature at which the base material layer is formed in the above-described method may be a temperature at which the base material layer nonwoven fabric is melted and thermally fused at a winding portion thereof (columnar iron bar). Also, a speed of a manufacturing line is not particularly limited, but when the filtration layer is formed, a tension applied to the nonwoven fabric is preferably 10 N or less, and it is preferable to wind the nonwoven fabric without applying tension.

A diameter and a thickness of the depth filter can be appropriately set according to desired performance and properties of a filtrate and are not particularly limited, but for example, when it is a depth filter used for slurry filtration in a manufacturing process of a lithium secondary battery material, a depth filter having an inner diameter of about 23 to 45 mm and an outer diameter of about 60 to 80 mm can be used. Such a depth filter can be manufactured, for example, by winding the base material layer nonwoven fabric by about 0.2 to 20 m, a laminate of the filtration layer nonwoven fabric and the net by about 0.2 to 8 m, and the skin layer by about 0.2 to 7 m.

The filter manufactured as described above can be suitably used as a cylindrical filter by cutting it to an appropriate size and attaching end caps to opposite ends.

Also, the above-described manufacturing method is merely an outline, and known steps such as a heat treatment, cooling, a chemical treatment, molding, and washing can be implemented as needed in addition to the above-described steps.

EXAMPLES

Hereinafter, the present invention will be described in more detail using examples, but the present invention is not limited thereto.

Measurement methods and definitions of physical property values described in the examples are as follows.

1) Method for Measuring Average Fiber Diameter

From a cross section of a filter medium of a filter imaged by an electronic microscope, a length (diameter) in a direction perpendicular to a length direction per one fiber was measured for 100 fibers, and an arithmetic mean value thereof was taken as an average fiber diameter. This calculation was performed using image processing software "Scion Image" (trade name) of Scion Corporation.

2) Method of Measuring Basis Weight

A weight of a nonwoven fabric cut into 250 mm×250 mm was measured, and a weight per unit area (g/m$^2$) was obtained and was taken as a basis weight.

[Example 1]<Example in which Mixed-Fiber Nonwoven Fabric (55 μm/32 μm=80/20) was Used as Filtration Layer Nonwoven Fabric>

Material

Base material layer nonwoven fabric: A mixed-fiber melt-blown nonwoven fabric having a mixed-fiber ratio of 1:1 between a propylene copolymer (melting point 135° C.) containing propylene having a basis weight of 50 g/m$^2$ and an average fiber diameter of 107 μm as a main component and crystalline polypropylene (melting point 165° C.) was used.

Filtration layer nonwoven fabric A: A through-air nonwoven fabric having a basis weight of 40 g/m$^2$ made of an eccentric sheath-core type composite fiber of crystalline polypropylene (melting point 165° C.; core)/high-density polyethylene (melting point 135° C.; sheath) was used. This through-air nonwoven fabric was a mixed-fiber nonwoven fabric in which an eccentric sheath-core type composite fiber having a fiber diameter of 55 μm and an eccentric sheath-core type composite fiber having a fiber diameter of 32 μm were mixed at a ratio (ratio by weight) of 80:20.

Net: A net having a mesh size of 2.0 mm made of polypropylene monofilament (average fiber diameter 250 μm) was used.

Manufacturing Method

A core (iron bar) was preheated to 150° C., and the base material layer nonwoven fabric was wound around the core by 5.6 m while the heating at 150° C. was continued. Next, insertion of the filtration layer nonwoven fabric A and the net was started. The filtration layer nonwoven fabric A and the net had an insertion length of 2 m and were wound together with the melt-blown nonwoven fabric for the base material layer. At this time, a first 1 m was wound while being thermally fused by heating at 150° C. and a heater output of 7.8 kW, and a remaining 1 m was wound without heating and thermal fusion at a heater output of 0 kW to form a filtration layer. Next, the melt-blown nonwoven fabric for the base material layer as a skin layer was wound by 1 m while being thermally fused by heating at a heater output of 7.8 kW to manufacture a cylindrical filter.

[Example 2]<Example in which Mixed-Fiber Nonwoven Fabric (55 μm/32 μm=80/20) and Single-Fiber Nonwoven Fabric (73 μm) were Used as Filtration Layer Nonwoven Fabric>

Material

Filtration layer nonwoven fabric A: A through-air nonwoven fabric having a basis weight of 40 g/m$^2$ made of an eccentric sheath-core type composite fiber of crystalline polypropylene (melting point 165° C.; core)/high-density polyethylene (melting point 135° C.; sheath) was used. This through-air nonwoven fabric was a mixed-fiber nonwoven fabric in which a composite fiber having an average fiber diameter of 55 μm and a composite fiber having an average fiber diameter of 32 μm were mixed at a ratio (ratio by weight) of 80:20.

Filtration layer nonwoven fabric B: A single-fiber through-air nonwoven fabric made of an eccentric sheath-core type composite fiber of crystalline polypropylene (melting point 165° C.; core)/high-density polyethylene (melting point 135° C.; sheath) having an average fiber diameter of 73 μm.

Manufacturing Method 1.7 m of the above-described filtration layer nonwoven fabric A and 0.3 m of the above-described filtration layer nonwoven fabric B were added to form one bolt. A cylindrical filter was manufactured in the same manner as in example 1 except that the filtration layer nonwoven fabric B was wound to be disposed on an outer side of the cylindrical filter.

[Example 3]<Example in which Mixed-Fiber Nonwoven Fabric (55 μm/32 μm=80/20) and Single-Fiber Nonwoven Fabric (32 μm) were Used as Filtration Layer Nonwoven Fabric>

Material

Filtration layer nonwoven fabric A: A through-air nonwoven fabric having a basis weight of 40 g/m² made of an eccentric sheath-core type composite fiber of crystalline polypropylene (melting point 165° C.; core)/high-density polyethylene (melting point 135° C.; sheath) was used. This through-air nonwoven fabric was a mixed-fiber nonwoven fabric in which a composite fiber having a fiber diameter of 55 μm and a composite fiber having a fiber diameter of 32 μm were mixed at a ratio (ratio by weight) of 80:20.

Filtration layer nonwoven fabric C: A single-fiber through-air nonwoven fabric made of an eccentric sheath-core type composite fiber of crystalline polypropylene (melting point 165° C.; core)/high-density polyethylene (melting point 135° C.; sheath) having an average fiber diameter of 32 μm.

Manufacturing Method 1.7 m of the above-described filtration layer nonwoven fabric A and 0.3 m of the above-described filtration layer nonwoven fabric C were added to form one bolt. A cylindrical filter was manufactured in the same manner as in example 1 except that the filtration layer nonwoven fabric C was wound to be disposed on an inner side of the cylindrical filter.

[Comparative Example 1]<Example in which One Type of Single-Fiber Nonwoven Fabric was Used as Filtration Layer Nonwoven Fabric>

Material

Filtration layer nonwoven fabric E: A single-fiber through-air nonwoven fabric made of an eccentric sheath-core type composite fiber of crystalline polypropylene (melting point 165° C.; core)/high-density polyethylene (melting point 165° C.; sheath) having a fiber diameter of 32 μm.

Manufacturing Method

A cylindrical filter was manufactured in the same manner as in example 1 except that 2 m of the above-described filtration layer nonwoven fabric E was used as the filtration layer nonwoven fabric.

<Collection Efficiency>

For each of the cylindrical filters of examples 1 to 3 and comparative example 1, collection efficiency was measured as initial collection performance according to the following test powders and method.

As the test powders, seven kinds described in JIS Z 8901 Test powders were used.

A test fluid in which the seven kinds of powders of JIS were added to water at a rate of 0.3 g/min was caused to pass through the filter at a flow rate of 30 L/min, and the number of particles before and after passing through the filter was measured (Reference: Filter guidebook for users, The Association of Liquid Filtration and Purification Industry).

The number of particles was measured using a particle sensor (KS-63, manufactured by Rion) with a particle counter (KL-11, manufactured by Rion).

The collection efficiency was obtained by the following definition formula.

Collection efficiency (%)=(1-number of particles having particle size×μm after passing through filter/number of particles having particle size×μm before passing through filter)×100

Table 1 shows measurement results of the collection efficiency.

TABLE 1

|  | Particle size (μm) | | | | |
| --- | --- | --- | --- | --- | --- |
|  | 30 | 50 | 60 | 80 | 100 |
| Example 1 | 48.6 | 88.3 | 93.8 | 99.6 | 100 |
| Example 2 | 44.4 | 84.9 | 94.1 | 98.4 | 100 |
| Example 3 | 47.7 | 86.7 | 95.1 | 99.1 | 99.9 |
| Comparative example 1 | 57.2 | 91.2 | 97.2 | 99.7 | 100 |

As shown in Table 1, the filters of examples 1 to 3 collected 99.9% or more of particles of 100 μm or more, and collection efficiency for particles of 30 μm was less than 50% (that is, more than half passed therethrough). On the other hand, the filter of comparative example 1 collected 100% of particles of 100 μm or more, but collection efficiency for particles of 30 μm was 57.2% (that is, more than half was collected). Even in collection efficiency for particles of 50 μm, examples 1 to 3 showed 84.9 to 88.3%, whereas comparative example 1 showed a high value of 91.2%. The result indicates that the filters of examples 1 to 3 can reliably collect coarse particles to be removed and pass small particles to be passed more reliably than the filter of comparative example 1, that is, indicates that clogging does not easily occur and classification performance is excellent.

<Pressure Resistance>

Samples for pressure resistance test were prepared by covering each of the cylindrical filters of examples 1 to 3 and comparative example 1 with a wrap film to wrap around the entire surface thereof so that the surface of the filter is sealed.

This filter was attached to a housing, water was fed using a pump, and a flow path was filled with water. Next, a flow rate of the pump was increased so that a pressure in the system was increased by 0.02 MPa at a time from 0.1 MPa and held for 1 minute, and a limit pressure at which the filter was deformed was measured by visually checking deformation of the filter.

Results of the pressure resistance test are shown in Table 2.

TABLE 2

|  | Pressure resistance (MPa) |
| --- | --- |
| Example 1 | 6.0 |
| Example 2 | 5.0 |
| Example 3 | 5.6 |
| Comparative example 1 | 3.6 |

Consideration

It was ascertained that the filters of examples 1 to 3 had high pressure resistance during filtration. On the other hand, it was ascertained that a filter medium of the filter of comparative example 1 was crushed in the pressure resistance test. It is thought that this is because the filter of examples 1 to 3 contains thick composite fibers in the filtration layer, whereas the filter of comparative example 1 does not contain thick fibers in the filtration layer. Since the pressure resistance is high, a slurry having a higher viscosity can be filtered for a long period of time.

Also, since the filters of examples 1 to 3 could remove fine particles corresponding to 100 μm and allow a large number of desired particles of 50 μm or less to pass, it was ascertained that the filters of examples 1 to 3 did not easily cause clogging and had higher classification performance compared to the filter of comparative example 1.

From these results, it was ascertained that the depth filters of examples 1 to 3 according to the present invention were excellent in filtration accuracy and pressure resistance.

Figure 1:
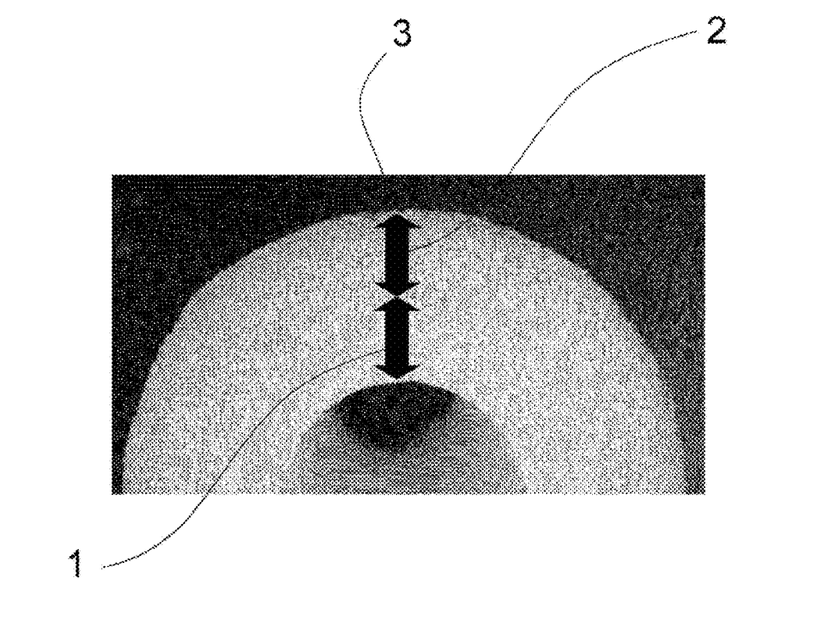
FIG. 1 shows a cross section of a depth filter according to an example of the present invention.

FIG. 1 shows a cross section of a depth filter according to the example of the present invention. In the depth filter of FIG. 1, a base material layer 1 is a layer formed by winding a melt-blown nonwoven fabric. A filtration layer 2 is a layer formed by laminating and winding a mixed-fiber through-air nonwoven fabric, a melt-blown nonwoven fabric, and a net. A skin layer 3 is a layer formed by winding a melt-blown nonwoven fabric.

INDUSTRIAL APPLICABILITY

The depth filter of the present invention has high pressure resistance in filtering slurries with various particle sizes because a mixed-fiber nonwoven fabric containing thick fibers and fine fibers is disposed in the filtration layer. Further, the depth filter of the present invention removes agglomerates or impurities from suspensions, slurries, and gel-like fluids containing fine particles (powders) of a low concentration to a high concentration (10 ppm to 70%) and can be suitably used as a filter used for obtaining fine particles having a particle size of a certain level or less. The depth filter of the present invention can be suitably used as a slurry filtration filter in a manufacturing process of a lithium secondary battery, and as an industrial filter for filtering abrasive slurries, paint slurries, pigment dispersions, and fluids of various types containing fillers such as, for example, liquids or fluids containing encapsulants, adhesives, film compositions, and coating agents.

The invention claimed is:

1. A depth filter comprising a base material layer, a filtration layer, and a skin layer in that order, wherein
   the base material layer and the skin layer are layers in which a nonwoven fabric is wound and thermally fused,
   the filtration layer is formed by winding a laminate in which at least a nonwoven fabric used for the filtration layer and a net are laminated twice or more, and
   the nonwoven fabric used for the filtration layer contains a mixed-fiber nonwoven fabric formed by mixing two or more types of fibers having different average fiber diameters from each other.

2. The depth filter according to claim 1, wherein
   the nonwoven fabric constituting the base material layer or the skin layer and the nonwoven fabric used for the filtration layer are different nonwoven fabrics from each other, and
   an average fiber diameter of the nonwoven fabric constituting the base material layer or the skin layer is larger than an average fiber diameter of the nonwoven fabric used for the filtration layer.

3. The depth filter according to claim 1, wherein the mixed-fiber nonwoven fabric is a nonwoven fabric in which a first fiber having an average fiber diameter of 0.5 to 50 μm and a second fiber having an average fiber diameter of 20 to 200 μm and thicker than the first fiber are mixed at a ratio of 1:99 to 90:10.

4. The depth filter according to claim 1, wherein the mixed-fiber nonwoven fabric contains a polyolefin-based sheath-core type composite fiber as the two or more types of fibers.

5. The depth filter according to claim 1, wherein the nonwoven fabric used for the filtration layer includes:
   the mixed-fiber nonwoven fabric; and
   a nonwoven fabric formed by one type of fiber having an average fiber diameter of 0.5 to 200 μm.

6. The depth filter according to claim 1, wherein the nonwoven fabric used for the filtration layer includes two or more of the mixed-fiber nonwoven fabrics.

7. The depth filter according to claim 1, wherein the nonwoven fabric used for the filtration layer is a melt-blown nonwoven fabric and/or a through-air nonwoven fabric.

8. The depth filter according to claim 1, wherein the net has a mesh size in a range of 1 to 5 mm and has an average fiber diameter in a range of 50 to 300 μm.

9. The depth filter according to claim 1, wherein the nonwoven fabric constituting the base material layer is a melt-blown nonwoven fabric or a through-air nonwoven fabric of a polyolefin-based fiber.

10. The depth filter according to claim 1, wherein the nonwoven fabric constituting the base material layer and the nonwoven fabric constituting the skin layer are the same nonwoven fabric.

* * * * *